United States Patent [19]

Trueblood

[11] Patent Number: 5,463,702
[45] Date of Patent: Oct. 31, 1995

[54] PERCEPTUAL BASED COLOR-COMPRESSION FOR RASTER IMAGE QUANTIZATION

[75] Inventor: John W. Trueblood, San Diego, Calif.

[73] Assignee: Sony Electronics Inc., Park Ridge, N.J.

[21] Appl. No.: 275,195

[22] Filed: Jul. 14, 1994

Related U.S. Application Data

[63] Continuation of Ser. No. 881,917, May 12, 1992, abandoned.

[51] Int. Cl.$^6$ .................................................. H04N 7/12
[52] U.S. Cl. ............................................ 382/239; 348/391
[58] Field of Search ................................ 348/391, 396

[56] References Cited

U.S. PATENT DOCUMENTS

| | | | |
|---|---|---|---|
| 4,613,948 | 9/1986 | Gharavi | 382/52 |
| 4,654,720 | 3/1987 | Tozawa | 358/75 |
| 4,768,082 | 8/1988 | Hiratsuka et al. | 358/12 |
| 4,769,702 | 9/1988 | Lievre | 358/13 |
| 4,808,984 | 2/1989 | Trueblood et al. | |
| 4,965,845 | 10/1990 | Chan et al. | 358/133 |
| 5,119,186 | 6/1992 | Deacon et al. | 358/433 |
| 5,140,412 | 8/1992 | Shishido et al. | 358/75 |
| 5,172,237 | 12/1992 | Blonstein et al. | 358/426 |
| 5,210,602 | 5/1993 | Mintzer | 382/50 |

OTHER PUBLICATIONS

Potlapalli et al., "Classification Techniques for Digital Map Compression", 1989, pp. 268–272.
Chau/Wong/Wan, "On the Selection of Color Basis for Image Compression", 1991, p. 441.
S. Tominaga, "A Color Classification Method for Color Images Using a Uniform Color Space", 1990, pp. 803–807.
Wu/Coll, "Single Bit–Map Block Truncation Coding of Color Images", Jul. 3, 1990, pp. 952–959.
Healy, "Color Discriminator by Computer", 1989, pp. 1613–1617.
"Quantization and multilevel halftoning of color images for near–original image quality", Gentile/Walowit/Allebach, vol. 7, No. 6/Jun. 1990/J. Opt. Soc. Am. A/pp. 1019–1026. U.S.A.
"Quantization of Color Images Based on Uniform Color Spaces", Gentile/Allebach/Walowit, Journal of Imaging Technology 16:11–21 (1990). U.S.A.
"Procedure for optimum choice of a small number of colors from a large color palette for color imaging", IBM Technical Disclosure Bulletin/vol. 29/No. 3/Aug. 1986, pp. 1329–1334. U.S.A.
"Color image quantization for frame buffer display", Heckbert, Computer Graphics/vol. 16/No. 3/Jul. 1982/pp. 297–307. U.S.A.
"an algorithm for multidimensional data clustering", Wan/Wong/Prusinkiewicz, ACM Transactions on Mathematical Software/vol. 14/No. 2/Jun. 1988, pp. 153–162. Univ. Regina, Canada.
"Variance–based color image quantization for frame buffer display", Wan/Prusinkiewicz/Wong, COLOR research and application/vol. 15/No. 1/Feb. 1990/pp. 52–58. Univ. Regina, Canada.

*Primary Examiner*—Stephen Chin
*Assistant Examiner*—Timothy J. May
*Attorney, Agent, or Firm*—Jerry A. Miller

[57] ABSTRACT

A method and apparatus for performing color compression uses human factors to weight a distance metric in order to select a set of k presentation colors to represent n colors in an original image, where n>k. This same distance metric is used as part of a process to select an optimal mapping of the original image pixels to the presentation colors. The presentation colors are selected based upon a data clustering scheme in which clusters of colors are selected based upon their respective distance from each color within a given cluster and from colors in other clusters. Colors in different clusters are required to be farther apart than colors in the same clusters. This accounts for colors with high importance in accurately presenting the presentation image but having low overall occurrence in the image file.

45 Claims, 9 Drawing Sheets

PERCEPTUAL BASED COLOR-COMPRESSION FOR RASTER IMAGE QUANTIZATION

This is a continuation of application Ser. No. 07/881,917, filed on May 12, 1992, now abandoned, which is hereby incorporated by reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

1. Filed of the Invention

This invention relates generally to the field of computer graphics. More particularly, this invention relates to a method and apparatus for color-compression for raster image quantization using an approximation of human visual perception as a component of the compression process.

2. Background of the Invention

There are many published color-compression (or data clustering) algorithms, each having a common approach. (For purposes of this document the terms "color-compression" or simply "compression" and like terms are intended to mean any process for reducing the number of colors in an image. Complete preservation of the original uncompressed image's information content is not required, but retention of high image quality is desired.) First a quantitative error metric is defined, then an algorithm is developed in attempt to mathematically minimize the error metric. Each of the known algorithms use the same metric, namely the mean-squared summation of the Euclidean distance of the source color coordinates from the quantized color coordinates for each pel. Mathematically:

Let c[i,j] be the 24-bit color of the pel at the (i,j) coordinate whose color components are (r,g,b) out of a set of n colors.

Let q(c[i,j]) represent the quantization function resulting in the presentation color whose components are (r',g',b') out of a set of k colors.

Let d(c,c') represent the quantitative difference between the two colors c and c'.

The quantization error metric D can then be calculated as:

$$D = \sum_{i,j} d(c[i,j], q(c[i,j]))$$

The difference function d(c,c'), in the published algorithms, is calculated as the Euclidean distance squared between the respective components of the two colors:

$$d(c,c') = (r-r')^2 + (g-g')^2 + (b-b')^2$$

To achieve good quality images using a limited number of presentation colors (the set of colors used in the color-compressed image) selected from a larger palate of colors, the quantization process should select the set of k presentation colors that result in the lowest possible value of the error metric D. The differences between the various existing algorithms is primarily in the method of selecting the presentation color set.

The literature shows several methods for selecting the presentation color set. For example, S. J. Wan, P. Prusinkiewicz, and S. K. M. Wong, "Variance-Based Color Image Quantization for Frame Buffer Display", Color Research and Application, Vol. 15, No. 1, February 1990, pp. 52–58; S. J. Wan, S. K. M. Wong, and P. Prusinkiewicz, "An Algorithm for Multidimensional Data Clustering", ACM Transactions on Mathematical Software, Vol. 14, No. 2, June 1988, pp. 153–162; Paul Heckbert, "Color Image Quantization for Frame Buffer Display", Computer Graphics, Vol. 16, No. 3, July 1982, pp. 297–307; Ronald S. Gentile, Eric Walowit, and Jan P. Allebach, "Quantization and Multilevel Halftoning of Color Images for Near-Original Image Quality", Journal of the Optical Society of America A—Optics and Image Science, Vol. 7, No. 6, June 1990, pp. 1019–1026; G. W. Braudaway, "Procedure for Optimum Choice of a Small Number of Colors from a Large Color Palette for Color Imaging", presented at Electronic Imaging '87, San Francisco, Calif., 1987 (Also published in IBM Technical Disclosure Bulletin, Vol. 29, No. 3, August 1986, pp. 1329–1334); and Ronald S. Gentile, Jan P. Allebach, and Eric Walowit, "Quantization of Color Images Based on Uniform Color Spaces," J. Imag Tech 16, 11–21 (1990) describe various techniques for color-compression. Each of these references is hereby incorporated by reference.

These references describe several algorithms for accomplishing this task. Among them, Heckbert describes a Popularity Algorithm and a Median-Cut Algorithm (k-d Tree). Wan, et al. describe a Mean-Split Algorithm, a K-Means Iterative Algorithm and a Variance-Based Algorithm. Braudaway presents his own algorithm for this purpose.

Each of these algorithms, in their own way, have the common goal of minimizing the error metric D as defined above. But, this is an effective quantization approach only if the metric used accurately reflects the perceived quality of the image.- However, the accepted metric has two distinct, widely known shortcomings. First, the color space on which the metric is based is non-uniform and non-linear. This means that the error metric has different meanings depending on what part of the color spectrum in which the source and destination pixel colors reside. Second, The influence of spacial proximity on the perceived colors is not accounted for in the metric.

For these reasons, sometimes a change in the quantization which reduces the error metric will generate an image which exhibits degradation of image quality when displayed on a CRT monitor. S. J. Wan et al. provides experimental evidence of a case where a mathematical improvement in the error metric resulted in perceivable degradation in the displayed image.

Two major issues are raised commonly but left unresolved among the published approaches: the desirability of a uniform color space and the desirability of incorporating human perception in the quantization process. Also, most published algorithms do not attempt to approximate a uniform color space. Gentile et al. experimented with L*u*v color space, but experienced difficulty in the conversion in an RGB environment due to device dependencies and system constraints, and noted that the resulting L*u*v coordinates were not actually uniform. In this case, using the L*u*v color space failed to produce superior quality quantizations of the image files.

Another problem with the existing algorithms is that no attempt is made to allocate some small portion of the CLUT (Color Look-Up Table) for periphery colors with low histogram counts. Such colors are often visually important in spite of low histogram counts. For example, an image may have a flower pot containing daisies with white pedals and yellow centers. If those yellow centers comprise the only yellow in that image, the existing algorithms may view the yellow as unimportant because of such a small occurrence in the image color histogram, and therefore gives little contribution to the error metric. However, from the perceptual perspective, it is important that the color appears yellow as opposed to red or green.

Sometimes a color with a low histogram count is actually more important to include in the presentation colors than a color with a higher histogram count. The key point is whether another color already has been selected in the presentation colors that is "sufficiently, close" to adequately represent the color in question, regardless of that cells histogram count, and regardless of that color's contribution to a quantitative error metric.

In all of the published algorithms, once the presentation colors have been selected, the source image is read pixel-by-pixel, and for each input pixel, the Euclidean distance function (used in the error metric) is used to determine the presentation color which has the minimum distance from the source color.

The problem with this quantization method is similar to the problem with the error metric, which is that the distance function is non-uniform and non-linear. The best mathematical presentation color may not be the best perceived color to select. This is a second order perceptual error introduced into the quantization technique. Firstly, the set of presentation colors contains errors in selection due to the inaccuracies and non-uniformity of the metric on which the selection is based. Secondly, once the presentation color set is selected, sometimes the quantization function may produce errors in selecting the nearest perceived presentation color, since the distance function used is non-uniform and non-linear. This compounding of errors substantially degrades the resulting image quality.

The present invention provides an improvement in perceived image quality of a color compressed image by addressing the human perception issues in the compression process, the effects of the display and the other problems described above.

SUMMARY OF THE INVENTION

It is an object of the present invention to provide an improved color-compression apparatus.

It is a further object to provide a color-compression technique which adjusts the error metric by human color perception factors.

It is another object to provide a color-compression technique which takes display variation into consideration.

It is a feature that the present invention produces color-compressed images with perceived quality approximating that of the original data with high levels of compression.

These and other objects, advantages and features of the invention will become apparent to those skilled in the art upon consideration of the following description of the invention.

In one aspect of the present invention, a method and apparatus for performing color compression uses human factors to weight a distance metric in order to select a set of k presentation colors to represent n colors in an original image, where n>k. This same distance metric is used as part of a process to select an optimal mapping of the original image pixels to the presentation colors. The presentation colors are selected based upon a data clustering scheme in which clusters of colors are selected based upon their respective distance from each color within a given cluster and from colors in other clusters. Colors in different clusters are required to be farther apart than colors in the same clusters. This accounts for colors with high importance in accurately presenting the presentation image but having low overall occurrence in the image file.

In one aspect of the present invention, a method of color-compression for reducing the number of colors in a source image of n colors to produce a color compressed image having k colors, includes the steps of selecting a collection of k colors to represent the source image such that no two of the colors c1 and c2 are closer together than a predetermined distance $d(c1,c2)$, where $d(c1,c2)$ is defined by:

$$d(c1,c2) = \sqrt{(Wr\Delta R)^2 + (Wg\Delta G)^2 + (Wb\Delta B)^2}$$

with:

$\Delta R$=the distance between the red components of c1 and c2, $\Delta G$=the distance between the green components of c1 and c2, $\Delta B$=the distance between the blue components of c1 and c2, Wr=red weighting factor for human perception of red, Wg=green weighting factor for human perception of green, Wb=blue weighting factor for human perception of blue;

and assigning one of each of the n colors to one of the k colors. The distances are preferably gamma corrected to compensate for characteristics of a predetermined display device.

Another aspect of the process includes the steps of providing a source image having n source colors; defining a set of k presentation colors; selecting one of the presentation colors to represent each of the n source colors by determining which of the presentation colors is perceptually closest to each the source color; wherein the perceptually closest color is defined as that color which has a minimum distance to the source color with distance determined by a distance metric incorporating a weighting factor for human visual sensitivity to a color component used in the distance metric.

In a color-compression method of the invention for compressing a source image having n source colors into a presentation image having k presentation colors, includes the steps of: generating a histogram of the n source colors to determine an order of frequency of occurrence of the source colors; defining a color table includes a plurality of J layers with each layer having a plurality of colors by the steps of; defining a first color distance criterion $S_c$ as a minimum spacing between colors, defining a second color distance criterion $S_L$ as a minimum spacing between colors assigned to different layers, assigning colors to the layers one layer at a time until each layer is filled, each color being required to be at least $S_c$ from each other color within the same layer and with spacing between colors in any previously assigned layers being required to be at least $S_L$.

A compressed image device according to the invention, for displaying a compressed image on a computer display, includes a storage media for storing computer files. A color look-up table is stored on the storage media, with the color look-up table mapping a table index to a color for each of k presentation colors. The presentation colors on the color look-up table includes a plurality of layers of colors with each layer includes a collection of colors separated by no less than a first predetermined separation factor $S_c$, and each color is separated by no less than a second predetermined separation factor $S_L$ from all colors in any other layer. A presentation image file is stored on the storage media, the presentation image file mapping pixels to an index in the color look-up table.

In another aspect of the invention, a color-compression device for compressing a source image having n source colors into a presentation image having k presentation colors, includes a memory for storing a histogram of the n source colors to reveal an order of frequency of occurrence of the source colors. A color table includes a plurality of J layers with each layer having a plurality of colors with a minimum spacing between colors within the same layer of $S_c$, and a minimum spacing between colors assigned to different layers $S_L$. Colors are assigned to the layers until each layer is filled, each color being required to be at least $S_c$ from each other color within the same layer and with spacing between colors in any previously assigned layers being required to be at least $S_L$.

In another aspect of the invention, a method for processing an image having n source colors to produce a compressed image, includes the steps of: selecting a collection of k presentation colors, where k<n, where each of the k presentation colors are a predetermined distance apart in an approximately uniform color space; and assigning each of the n source colors to one of the k presentation colors by determining which of the k presentation colors is closest to each of the n source colors in the approximately uniform color space. Preferably, this method further includes the step of reselecting the k presentation colors as the average of each of the n source colors assigned to each the presentation color.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

DETAILED DESCRIPTION OF THE INVENTION

Figure 1:
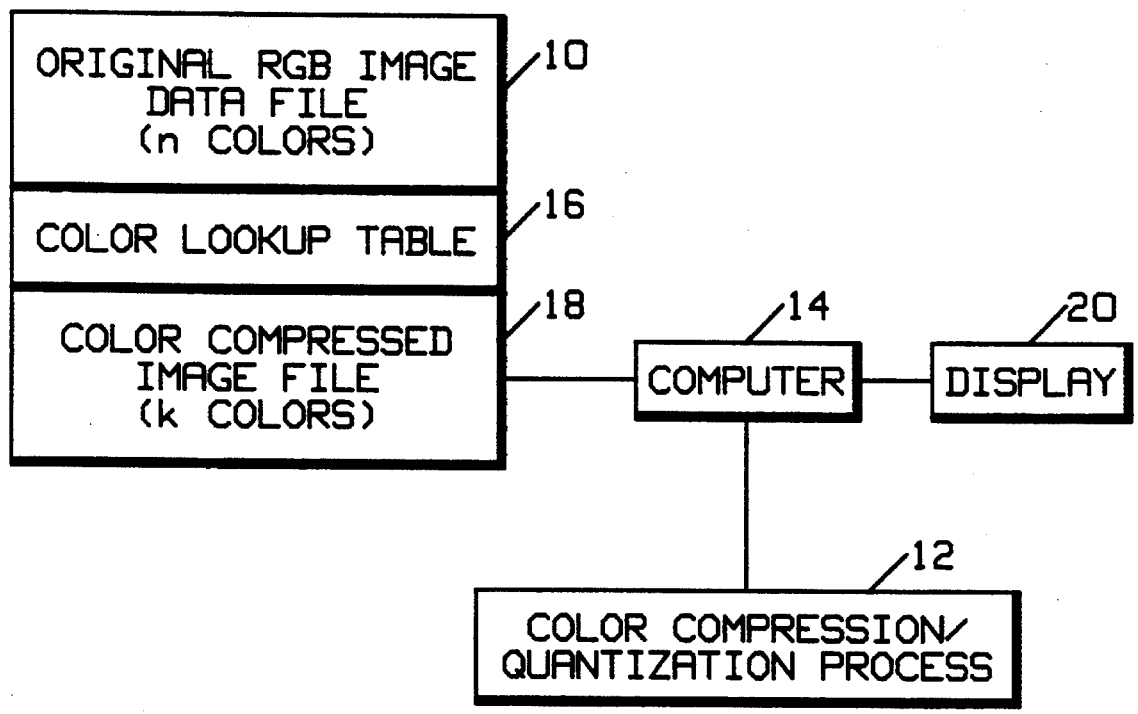
FIG. 1 is a block diagram of the color-compression system of the present invention.

One example of a color-compression system and process according to the present invention is shown broadly in FIG. 1. An original image file 10 having n colors is processed by the color-compression/quantization process 12 operating on computer 14 of the present invention. With reference to a look-up table 16 generated during the process, a color compressed image file 18 in k colors is generated. The resulting image can be displayed on a computer display 20, typically having a limited number of colors for display of such an image. The resulting image can also be stored in any suitable storage media such as floppy disks, optical disks, computer tapes, magneto-optical disks, hard disk drives, etc. (or alternatively, the image can be displayed and discarded). Those skilled in the art will appreciate that the generalized configuration of FIG. 1 can be adapted to many specialized tasks of which the compressed image display forms an integral part such as medical imaging systems, remote image retrieval, and the like. Alternatively, rather than using an image file as an input to the present compression process, any other source of a frame of video could be used as an input (for example, a live video camera attached to a frame grabbing device, or a raster scanning device could provide a suitable input).

Before describing the details of the process of the present invention, first consider the background theory as to how the invention operates. In order to achieve high quality color-compression, there are two key issues to be addressed by this invention in the process of image quantization: accurate selection of the optimum presentation color set and accurate mapping of the source pixels into the presentation color set. If the selection accuracy is defined in terms of what the human eye perceives on the display, then the quantization method should incorporate factors related to the response of the display device and factors related to human visual system sensitivities.

The present invention provides an image quantization technique which has been developed to address these issues. Broadly speaking, the invention approximates a uniform color space, then selects presentation colors based on theories of color grouping and color perception, rather than arbitrarily minimizing an error metric which only loosely corresponds with perceived image quality. An error metric may be applied after the quantization as a rough mathematical indication of the quantization fit, but the new quantization method is not in any way directly coupled with the error metric itself. Both the presentation color selection and the mapping of the input pixels to the colors selected are based on properties of color display devices, properties of the human visual system, and theorized properties of the occurrence of colors in a raster scanned photographic image, independent of the quality metric. In this way, the quantization is perceptually based, rather than based on minimizing the mathematical entropy from an inaccurate quantitative metric.

This decoupling enables one to experimentally adjust various quantization parameters to obtain the best visual image without necessarily improving the accuracy of the metric itself. Also through this decoupling, it becomes possible for the algorithm to select perceptually important colors with low histogram counts as presentation colors. Selection of these colors may not improve, and, in some cases, may actually degrade a typical quality metric.

The preferred embodiment of the invention utilizes two new techniques to achieve improved image quality in a color compressed image. However, those skilled in the art will appreciate that each of these two techniques could be used individually or in combination with other techniques to achieve improved color-compression. The first technique is the development of a quantitative and practical method for approximating a uniform color space. The second is use of a perceptual-based process for presentation color selection.

From both the theoretical standpoint and from preliminary experimental results, the combination of these three techniques produce higher quality quantizations than the previously published methods. The new algorithm produces highly color-compressed images appearing very near to the quality of the original data.

The color-compression technique of the preferred embodiment reduces a raster image data file from n possible colors for each pixel (the selection color palette) to k total colors in the output data file (the presentation color map). Typically n=16 million (24 bits per RGB color), and k=256 (for an 8 bit-plane frame buffer system). However, the process may be generalized to any set of values for n>k>1.

One typical objective of color-compression is for the reduced color image to appear as close as possible to the original image without introducing visible artifacts, such as contouring and incorrect colors. To address this goal, the presentation color map is selected to accurately represent the total color palette of the source image according to the content and usage of colors in that image. Since the visibility of artifacts relies on human visual perception, the present invention quantitatively incorporates an approximation of human visual properties and display response properties into the color selection and quantization process.

A uniform color space is a mathematical representation of colors such that the calculated distance between two color values corresponds with the perceived amount of difference between those same colors as observed by the human eye, for any two colors in the spectrum. The CIELUV color space is intended to be approximately uniform. However, the conversion from an RGB color space to CIELUV is somewhat complicated, and some error is introduced in converting RGB to CIELUV for calculation, then back to RGB for display. Experiments have shown that when CIELUV coordinates were applied to the new color-compression calculations, there was no visible improvement in the resulting image quality.

For that reason, a new method of approximating a uniform color space has been devised which is simple to calculate from the RGB color space. The new method has experimentally shown noticeable improvement in image quality for every image processed so far. Those skilled in the art will appreciate that further refinement of this approximation, or other approximations of a uniform color space could be substituted with an expectation of good results.

The pixel values are left in the RGB color space. Then the approximation is applied to the distance calculation between colors. This way the pixel values themselves are not converted. In the preferred embodiment, two factors are introduced into the distance calculation: the gamma response of the display device, and the relative chromatic sensitivity of the human eye to each of the primary colors. The chromatic sensitivity of the eye is introduced in the calculation for distance between two colors. The equation used for distance calculation is similar to the distance calculation used in known techniques except for the presence of weighting factors. In the preferred embodiment, these weighting factors are introduced in the following equation:

$$d(c1,c2) = \sqrt{(Wr\Delta R)^2 + (Wg\Delta G)^2 + (Wb\Delta B)^2}$$

Where:

d is the distance between the colors c1 and c2, $\Delta R = r_{c1} - r_{c2}$, r is the gamma corrected red component, $\Delta G = g_{c1} - g_{c2}$, g is the gamma corrected green component, $\Delta B = b_{c1} - b_{c2}$, b is the gamma corrected blue component, Wr=0.30 (NTSC red weighting factor), Wg=0.59 (NTSC green weighting factor), and Wb=0.11 (NTSC blue weighting factor).

The square root operation can be omitted when the distance calculation is only used for a comparison with other distances and thus the absolute distance is not important. Standard NTSC weighting factors are used for the weighting factors in the preferred embodiment. The equation for gamma correction is derived in U.S. Pat. No. 4,808,984 to John Trueblood et al. which is hereby incorporated by reference. The equation appears below:

$$\beta = kE^{1/\gamma}$$

Where:

$\beta$ is the gamma corrected brightness value, k is the maximum brightness value, E is the desired linear brightness such that 0<E<1, and $\gamma$ is the gamma response of the display.

For the development work supporting the present invention and for prototype purposes, $\gamma=2.67$ was used. This represents the gamma response of a model GDM-1950 display manufactured by Sony Corporation. This gamma value is representative of Sony Corporation's entire GDM line of displays. For other displays, the appropriate value of $\gamma$ can be obtained from the manufacturer of the display or determined experimentally. However, the above value of gamma has been found to be a good general purpose value for a number of other displays.

According to the present invention, the logic by which presentation colors are selected is based on how colors are likely to occur in a photograph of three dimensional objects. Consider, for example, a simple photograph of a sphere. The sphere appears to have depth because of the gradually varying shades of color across the surface. Therefore, to represent the depth of the sphere on a frame buffer display, a good sample of the various shades must be included in the presentation color set. These shades of color will have a small separation from each other, and can be considered as a color cluster. The number of shades required to convey depth without contouring depends largely on the size of the sphere.

Now consider the case of multiple spheres in a photograph, each in a different size and color. Each sphere will require a cluster of colors allocated to represent that sphere accurately. If one of the spheres is very small, then the color tabulation in the frequency histogram will be very small. Mathematically, the contribution of the color values of that sphere may be insignificant, but to a human observer the colors may be important. For example, the small "sphere" may be a person's eye in the photograph, which may look very strange if the wrong presentation color is used.

Therefore, the color-compression technique of the present invention is designed to seek out clusters of closely grouped colors, each cluster having successively greater color separation from previously selected clusters.

Figure 2:
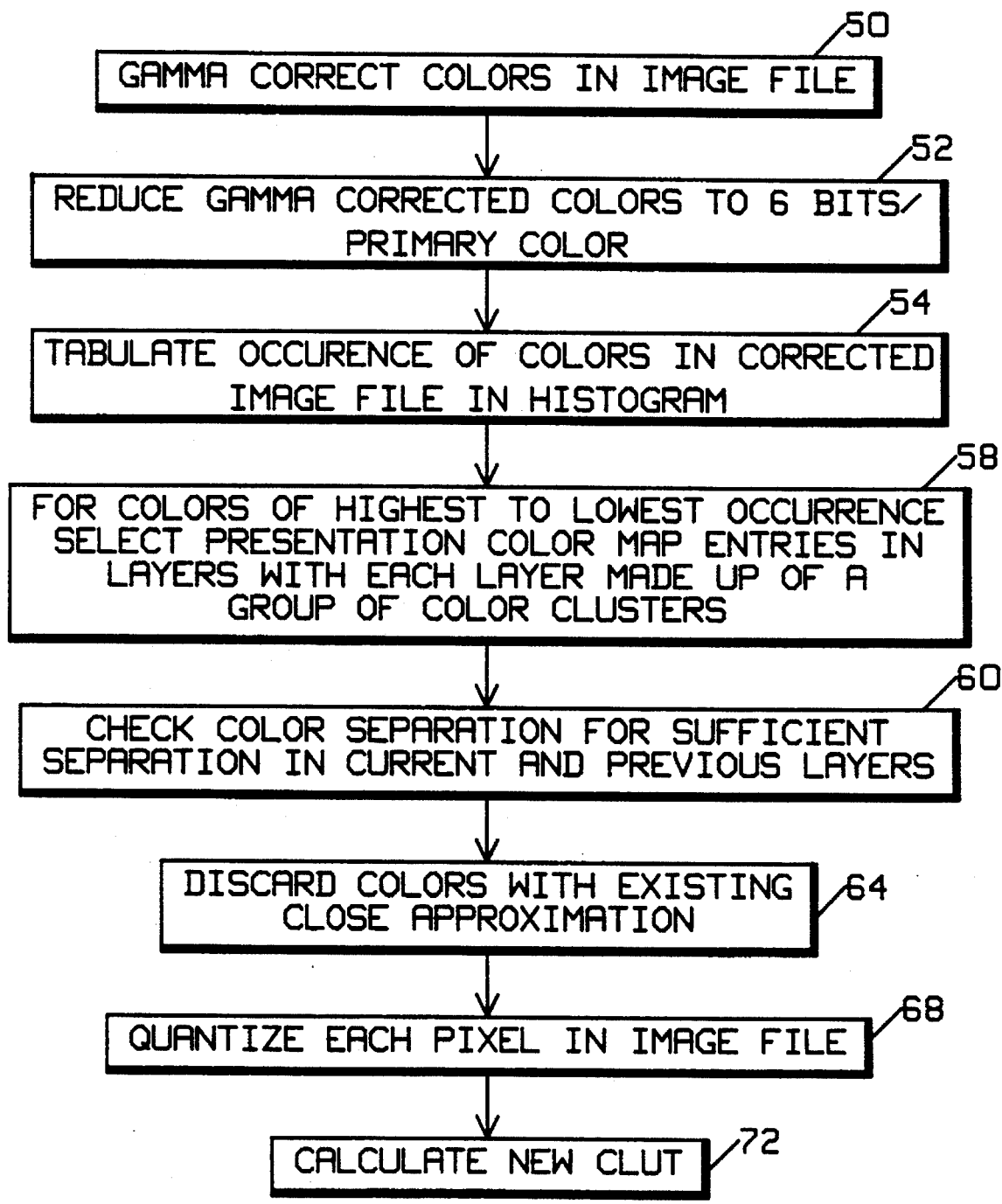
FIG. 2 is a flow chart of the overall color quantization process of the present invention.

Now consider the details of how this theory is applied to the process of color-compression. FIG. 2 broadly describes the methods of the present invention. First, unlike the existing methods, the original colors (in the image file or other source of a frame of video) are gamma-corrected prior to histogram tabulation so that the monitor response will appear linear in the color separation calculations at step 50. The corrected colors are then reduced to 6-bits per primary color at step 52, since studies show this to be beyond noticeable human sensitivity and reduces the memory space and processor time required to process the histogram array. Step 52 is carried out by simple truncation and results in an immediate reduction of the number of colors present without introduction of significant error. A histogram is made tabulating the occurrence of all colors in the original image file at step 54.

Next, the process attempts to identify clusters of colors. Starting with the color of highest occurrence and progressing toward the least frequent color, presentation color map (CLUT) entries are selected in layers at step 58. Each layer is made up of a group of color clusters. About eight such layers is typically adequate to provide good results. Each layer has several parameters associated therewith. Each layer has a designated number M of colors (which can change from layer to layer), a parameter specifying a minimum separation $S_c$ between colors within the same layer, and a minimum separation $S_L$ from colors of all previous layers. For the preferred embodiment, $S_c < S_L$ so that the separation of colors between layers is required to be greater than the separation between colors in the same layers.

The uniform color space approximation is used in step 60 to all color separation (distance) calculations. Progressing from the most to least frequent color, each color in the histogram is tested at step 60 first to see if there is sufficient separation (using the distance calculation) from the colors already selected in the current layer, then it is tested for sufficient separation from all of the colors in all previously defined layers. If the color in question fails either test, it is discarded at step 64 because it is already represented by another CLUT entry. Each layer size is defined by the number of CLUT entries allocated to that layer. When the allocated number of colors are selected, the separation parameters are advanced and the next layer begins. The process is complete when the last layer is full.

It should be noted that these parameters may result in significant colors being deleted. For example, if M for the first layer is 5 (five colors in the first layer), the next color tested could be close enough to each of the first five colors to have been included in the first layer, but not far enough away to have been included in the second layer. However, as will be explained later, this is compensated in later process steps. It should also be noted that M should generally be larger for the first layers and progressively smaller for subsequent layers.

After the CLUT is selected, the original image is quantized at step 68 by finding the CLUT entry closest to the color of each pixel in the input file, then writing the CLUT index to the output image file. Once again, a uniform color space is approximated for the color separation calculation to determine which color in the CLUT is closest.

As each pixel is quantized, the original pixel color is added to an RGB accumulator for the CLUT entry selected. At the end of the quantization, a new CLUT is calculated at step 72 by selecting the average color of all of those quantized to the color of the original CLUT entry. For each index of the CLUT, the RGB accumulator is divided by the number of pixels quantized to this index to calculate the average and produce a new CLUT. The new CLUT is then output to a file. The index into the color look-up table which references the selected presentation color is used as the output pixel value. The final presentation colors are then selected to be the computed averages of all the source colors quantized to each color look-up table index.

By creating this average for each CLUT entry at 72, those colors discarded in step 64 are factored into the final color selected for representation in the presentation image. So, in the above example, the color which is discarded due to having a distance greater than $S_c$ but less than $S_L$ are factored back in. This is done by the process of averaging all colors assigned to a presentation color in the original CLUT and reassigning the presentation color in the CLUT to be the average of all colors assigned to the presentation color.

Note that it may be possible to further refine the image quality for some images by an additional iteration of the process using the refined CLUT as the original CLUT. This should theoretically result in a better initial choice of colors so that the final CLUT more accurately represent the original image when a second iteration is complete.

Figure 3:
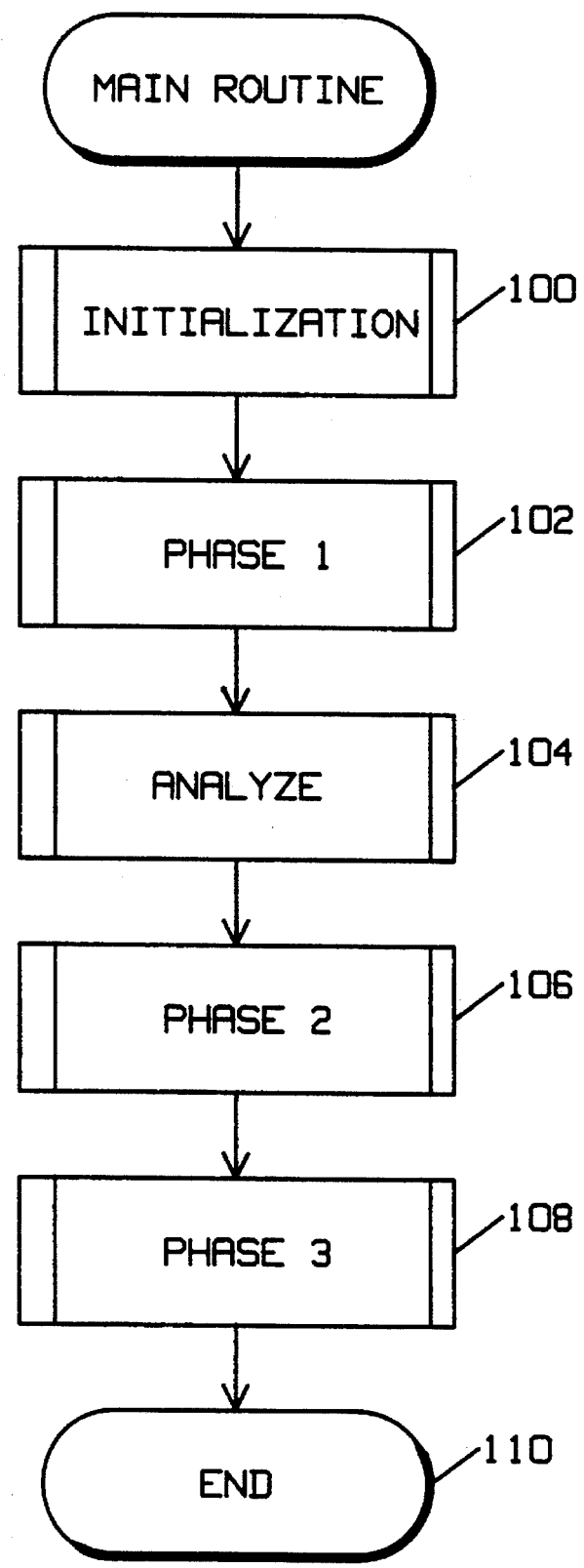
FIG. 3 is a flow chart describing the color-compression process of the present invention as implemented in the prototype.
Figure 4:
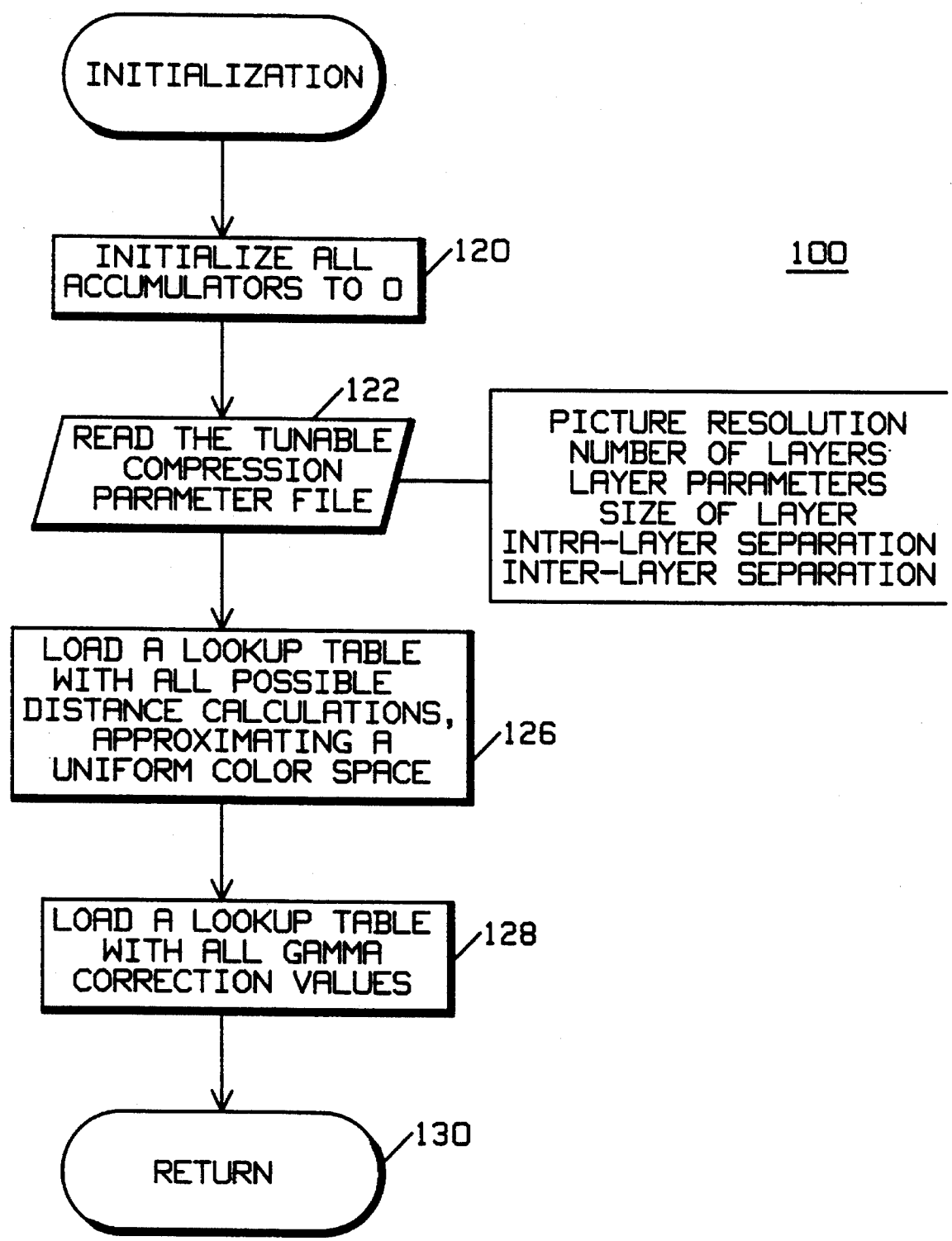
FIG. 4 is a flow chart of the initialization process of FIG. 3.

Now consider the details of the implementation of this process as used in the prototype. The overall process is described in FIG. 3 in which initialization is carried out at step 100, phase 1 of the color compression process is carried out at step 102. In this phase, the pixel values are gamma-corrected and the colors are selected for the color look-up table based upon the histogram data. At step 104, an analysis phase is carried out in which statistics on color content are tabulated. At step 106, phase 2 of the color compression process is carried out. In this phase, the uniform color space approximation is used to find the closest value in the color look-up table for each pixel in the source data file. This is also where the averaging process previously discussed is carried out. At step 108, the third phase of the color compression process is carried out. In this phase, the output pixel file and the output color look-up file are written. The color compression process ends at step 110. Each of the above steps are discussed below in greater detail.

Initialization process 100 begins by initialization of all accumulators to zero at step 120. A file is provided which contains all tunable compression parameters in the preferred embodiment. These parameters include picture resolution, number of layers, layer parameters such as size of layer, intra-layer separation $S_c$ and inter-layer separation $S_L$, etc. These parameters are read from the tunable compression parameter file at step 122. At step 126, a look-up table is loaded with all possible distance calculations approximating a uniform color space. At step 128, a look-up table is loaded with all gamma correction values and the process returns at step 130.

Figure 5A:
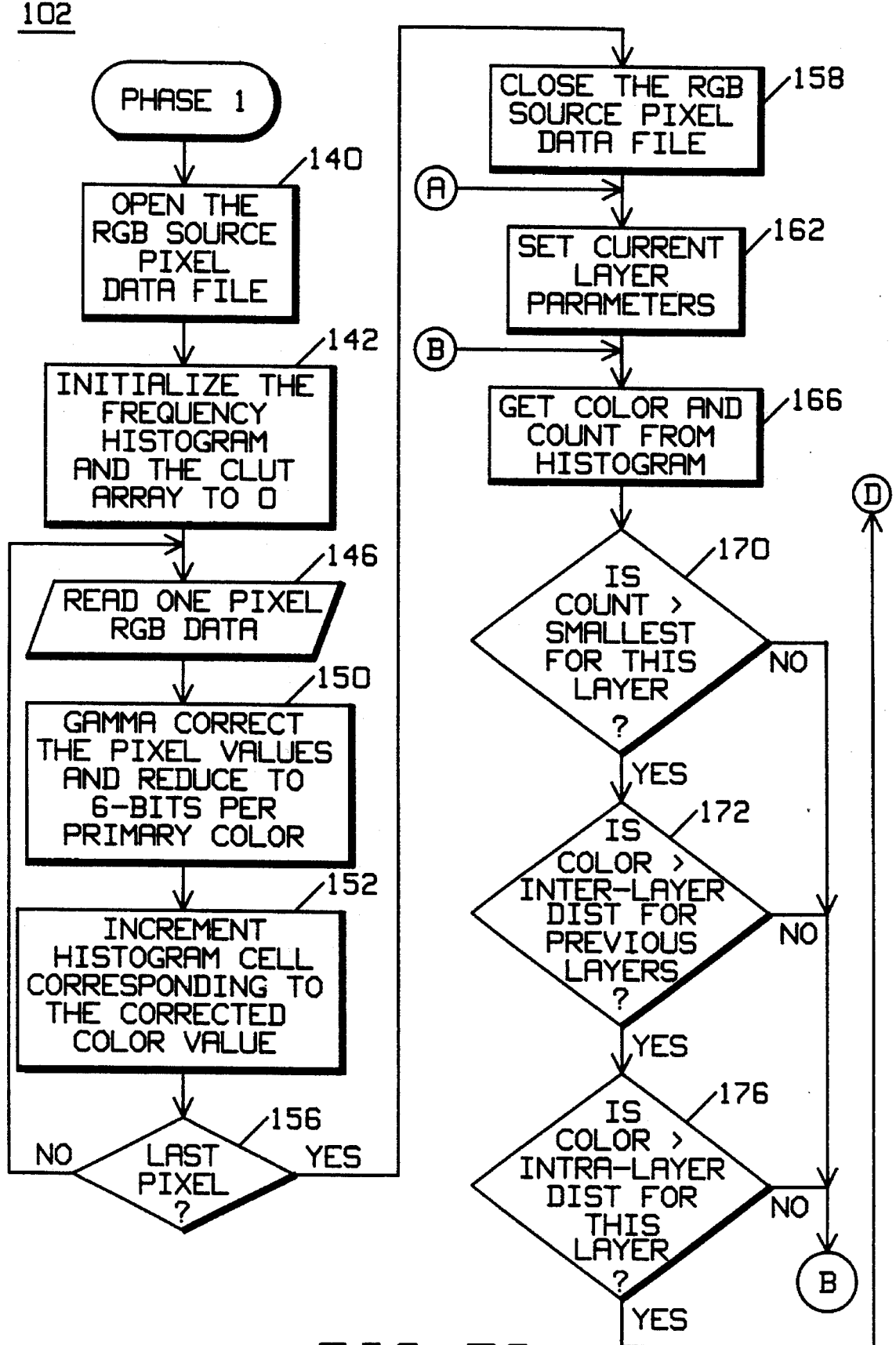
FIGS. 5A and 5B are a flow chart of phase 1 of the process of FIG. 3.
Figure 5B:
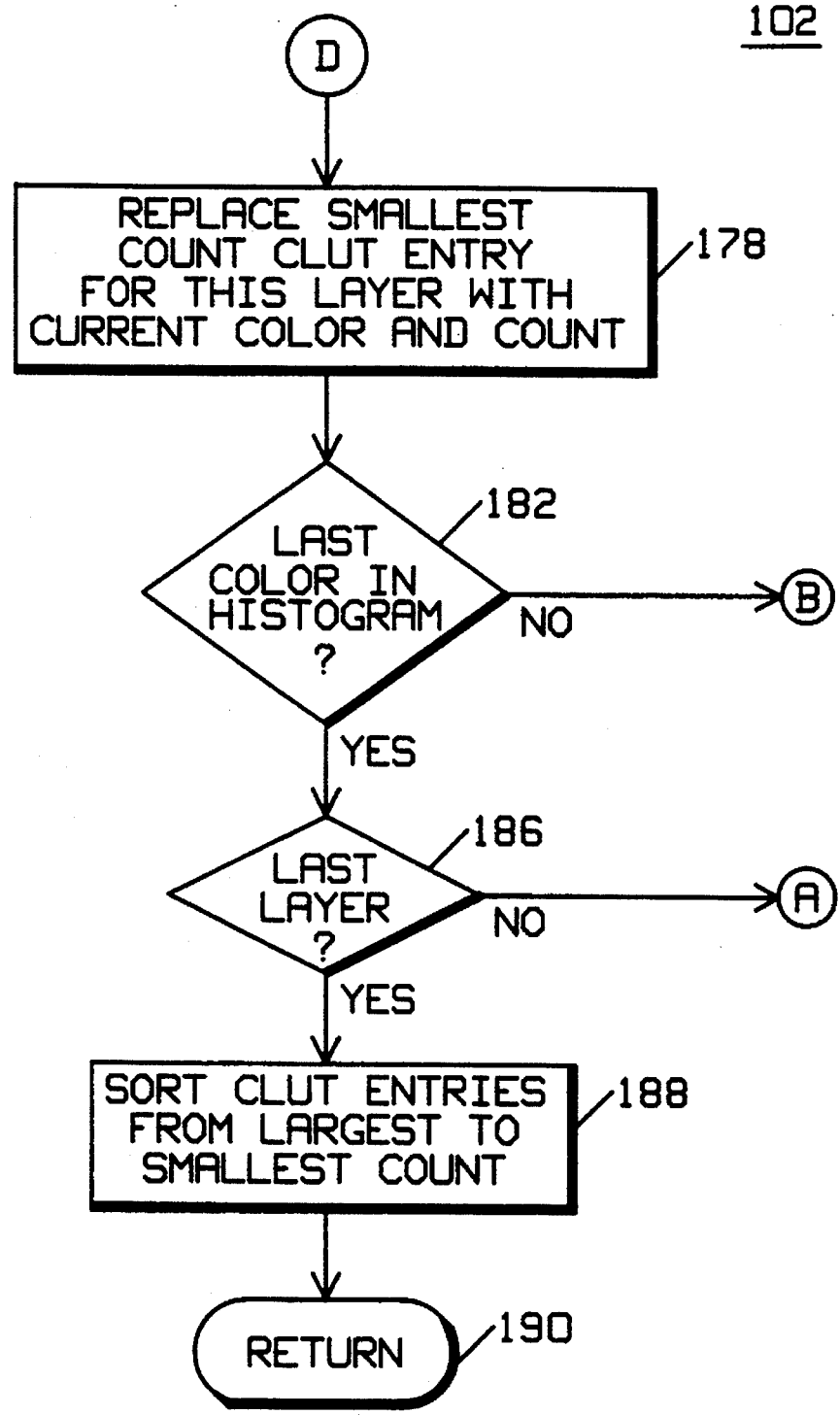

Turning now to FIG. 5, phase 1 of the color compression process is described. At step 140 the RGB source pixel data file is opened and the frequency histogram and color look-up table array are initialized to zero at step 142. One pixel of the input RGB data is read at step 146. The pixel's RGB vector is gamma corrected at step 150 and truncated to 6 bits per primary color. Then, at step 152, the histogram cell corresponding to the corrected color value is incremented. If this is not the last pixel at step 156 the next pixel is read at step 146. This process continues until the last pixel is read at step 156. Control then passes to step 158.

When the last pixel has been read at step 156, the RGB source pixel data file is closed at step 158. The current layer parameters are set at step 162. At step 166, a color and a count is retrieved from the histogram. This color will be tested in subsequent steps.

Since sorting is a very time consuming operation, the actual compression process avoids sorting by the equivalent process of making a pass through the histogram for every layer. This is represented in the flow chart as step 170. Step 170 is a performance improvement mechanism which eliminates the need for actually sorting the histogram. This part of the process is logically equivalent to operating with a histogram sorted from greatest to least occurrence. At step 170, the routine determines whether or not the count is greater than the smallest count selected thus far for this layer. If so, control passes to step 172 where the color is tested to determine whether or not its inter-layer distance is greater than previous layers. In other words, is the color far enough from any color in all previous layers to be considered to be a new color in the color look-up table. If so, control passes to step 176 where the color is again tested to determine if it is greater than the intra-layered distance for this current layer. In other words, is the current color far enough away from all colors in the current layer to be considered a new color. If so, control passes to step 178.

If any of the tests carried out in steps 170, 172 and 176 are failed, the routine returns to step 166 where the next color encounter is retrieved from the histogram.

At step 178, the smallest count color look-up table entry for the current layer with the current layer and count are replaced. If this is not the last color in the histogram at step 182, the routine loops back to step 166 to retrieve the next color and count. If it is the last color in the histogram at step 182, step 186 determines whether or not the current layer is the last layer. If not, the routine loops back to step 162 where the current layer parameters are set for the next layer. If so, the color look-up table entries are sorted at step 188 from the largest to the smallest count and the routine returns at step 190.

Figure 6:
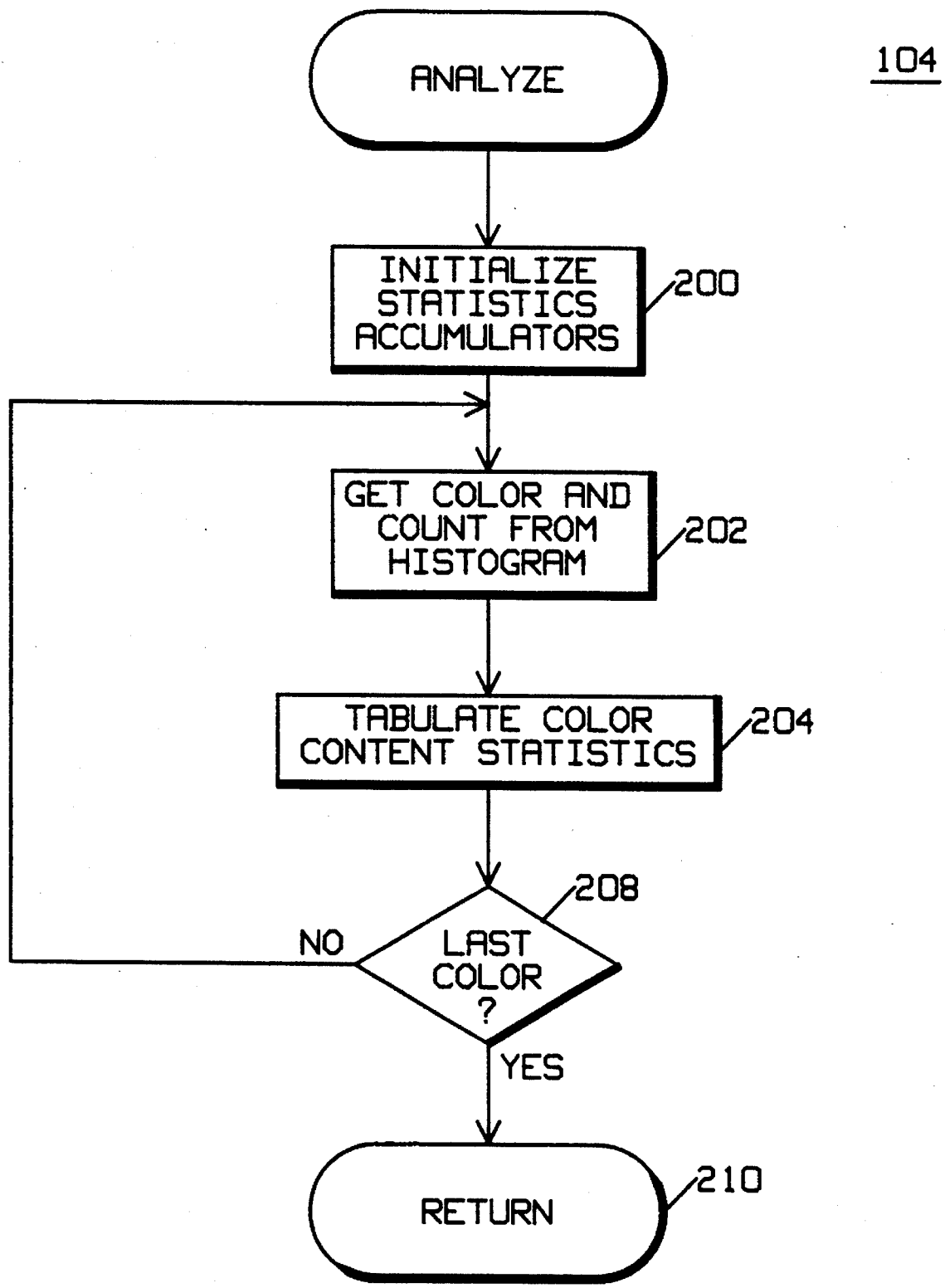
FIG. 6 is a flow chart of the analysis phase of the process of FIG. 3.

Turning now to FIG. 6, the process 104 is described in greater detail. This process is used for information only and does not actually contribute to the compression process except to the extent that it provides useful feedback in adjusting the compression parameters. At step 200, all statistic accumulators are initialized. Histogram colors and counts are retrieved at step 202 and the color content statistics are tabulated at step 204. Steps 202 and 204 are repeated for each color until the last color has been tabulated. When this last color is detected at step 208 the routine returns at step 210.

Figure 7:
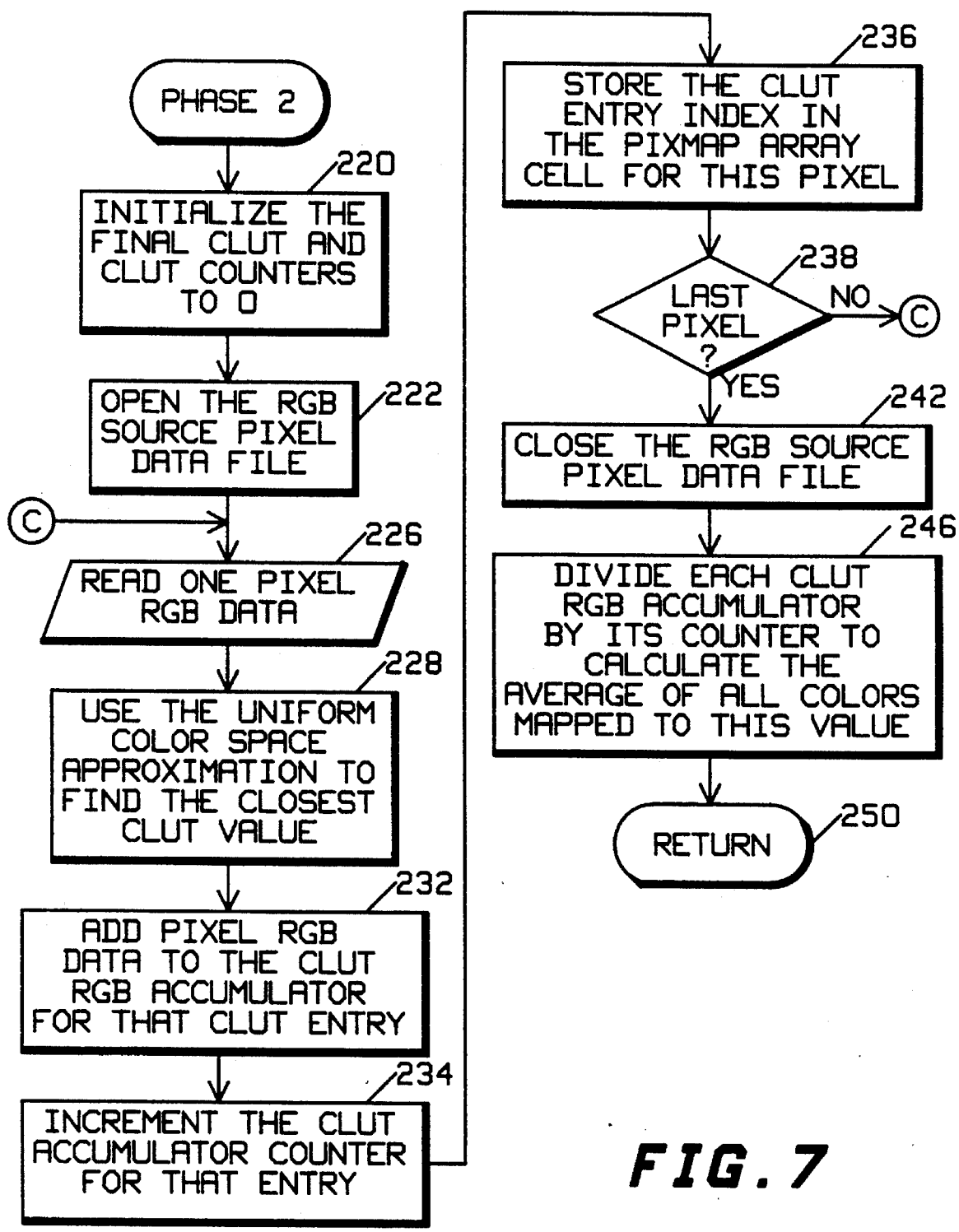
FIG. 7 is a flow chart of phase 2 of the process of FIG. 3.

Turning now to FIG. 7, phase 2 of the color compression process begins by initialization of the final color look-up table and color look-up table counters to zero at step 220. The RGB source file is opened at step 222 and one pixel of RGB data is read at step 226. At step 228, the uniform color space approximation is used to find the closest color look-up table value and the pixel RGB data is added to the color look-up table RGB accumulator for that color look-up color entry at step 232. The color look-up table accumulator counter is incremented at step 234 for the current pixel entry. The color look-up table entry index is stored in the pixel map array cell for this pixel at step 236 and this process is repeated until step 238 detects that the last pixel has been processed. This is accomplished by looping back from step 238 to step 226 until the last pixel is processed. Once this last pixel is processed the RGB source pixel data file is closed at step 242. Each color look-up table RGB accumulator value is divided by its counter to. determine the average of all colors mapped to a particular value in the color look-up table at step 246. The color look-up table values have been adjusted to these average colors and the process returns at step 250.

Figure 8:
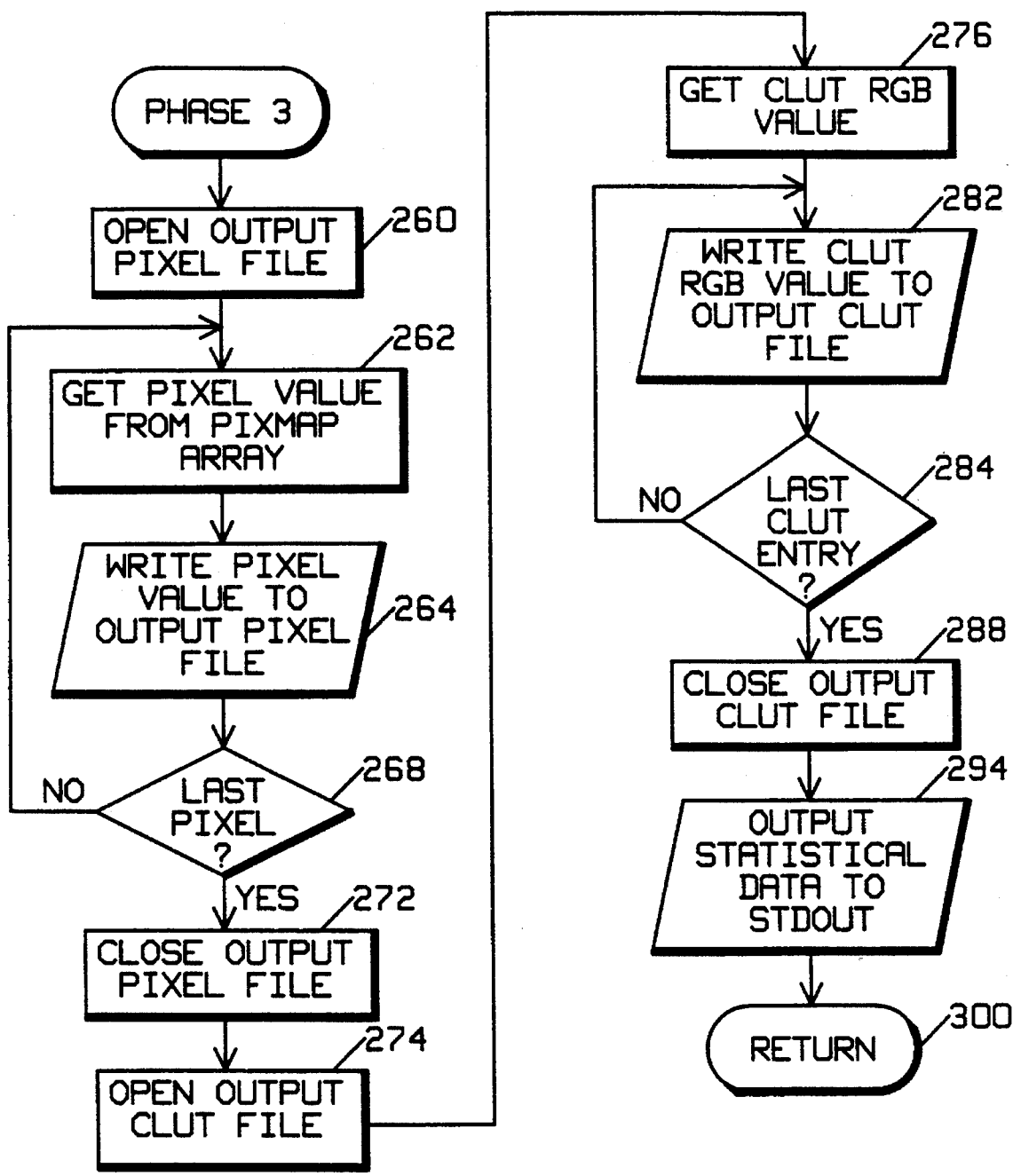
FIG. 8 is a flow chart of phase 3 of the process of FIG. 3.

Phase 3 of the color compression process is shown in FIG. 8 and begins at step 260 where the output pixel file is opened. A pixel value is then retrieved from the pixel map array at step 262 and the pixel value is output to the output pixel file at step 264. Steps 262 and 264 are repeated until the last pixel is processed as detected by step 268. Control then passes to 272 where the output pixel file is closed. The output color look-up file is opened at step 274 and the color look-up table RGB value is retrieved at step 276. This color look-up table RGB value is written to the output color look-up table file at step 282. Step 282 is repeated until the last color look-up table entry has been processed as detected at step 284. The output color look-up table file is then closed at step 288. Statistical data is output at step 294 and the process returns at step 300.

The present color-compression technique reduces the number of individual colors contained in a raster image data file while maintaining a high quality appearance to the image on a graphic display monitor. The output is a new image data file which requires less memory to store and fewer bit planes to display, thus allowing high-quality images to appear on limited color display systems with minimal visible artifacts, such as contouring and obvious color errors. The colors in the presentation color map are selected based on the color content of the source image, properties of the human visual system, color display response, and theories about color occurrence in a photographic image. The algorithm relies on a practical, quantitative method of approximating a uniform color space.

Experimental Results

The prototype implementation of the present invention is written in the C programming language with very little optimization. A copy of the prototype code used for the experiments described below is incorporated herein as APPENDIX I. This code is copyright © 1990, 1991, Sony Corporation of America, All Rights Reserved (except as noted in the copyright notice above). Currently on a Hewlett Packard HP-9000/370 Unix workstation operating with the version 7.0 of the HP-UX" operating environment and running native C, a 1024×1024 image can be processed using this prototype code in approximately 1 minute, and a 2048×2048 image requires approximately 4 minutes.

Using the present invention, a number of raster scanned photographs of 1024×1024 resolution were processed, reducing the color content from 24-bit RGB in the source file to 8-bit (256 colors), 7-bit (128 colors), and 6-bit (64 colors) output files which were then displayed on a frame buffer device. The total number of distinguishable colors actually occurring in the source data file ranged from 20,000 to 70,000 unique 24 -bit RGB values. The image content included green foliage, colorful flowers, large areas of blue skies with wispy clouds, bodies of water, flesh tones, buildings and streets, etc. The resulting processed images were displayed using an HP-9000/370 workstation and presented to a group of observers for comparison.

The 256-color and the 128-color compressed images produced little or no noticeable contouring or incorrect color artifacts. The 64-color compressed images are of good quality, but contouring and other artifacts begin to be noticeable to the observers for some images.

In the prototype of the present invention, subtle but important image quality improvement resulted from applying the new uniform color space approximation to the color-compression process. For example, without the color space approximation, a slight contouring was evident in the sky of a test image. However, a smoother color transition was apparent after the color space approximation was added.

So far, experimental results show that high visual quality of a variety of images has been achieved using the present technique. As each parameter related to the display device, to the human visual system, and to the perceptual-based selection of colors was added to the algorithm, an incremental improvement in the quantized image quality was observed, thus showing some substantiation of the theories. Since changes in the color space calculations also change the range and magnitude of the error metric, image quantization error could only be evaluated visually. In all cases, the visible improvement was apparent to all observers.

Those skilled in the art will appreciate that many variations of the present invention are possible without departing from the invention. For example, rather than use of additive primary colors, subtractive primary colors with appropriate weighting factors could be equivalently used. Similarly, although the preferred embodiment uses a color look-up table with a presentation image file mapping pixels to an entry point in the table, those skilled in the art will recognize that other storage schemes are possible. For example, the presentation image could be stored as a table mapping pixels to actual color values without departing from the invention.

Those skilled in the art will recognize that the uniform color space approximation of the present invention can be applied to numerous fields such as image processing, several different forms of anti-aliasing, desktop publishing (WYSIWIG applications) and the like. Also, the presentation color selection process can be broadly applied to find groups of similar data according to perception.

In the preferred embodiment, the distance between two colors are determined by use of a lookup table rather than actually computing the distance each time. This optimizes processing time. However, the actual computation could also be done. Where absolute distances are not important but relative closeness is being compared, it is generally unnecessary to take the square root. That is, when determining whether color C is closer to C1 or C2, the square of the distance can equally well be used for comparison with accompanying improvement in computation time. Also, although the prototype embodiment uses a technique to avoid sorting the histogram, actual sorting could also be done and is considered entirely equivalent. Other variations will occur to those skilled in the art.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. In a computer system which displays images as an array of pixels on a display device, a method of color-compression for reducing the number of pixel colors in a digitized image represented by n colors to produce a color compressed image represented by k colors where k<n, comprising the steps of:

selecting a collection of k colors to represent said digitized image such that no two colors c1 and c2 of said k colors are closer together than a predetermined distance d(c1,c2), where d(c1,c2) is defined by:

$$d(c1,c2) = \sqrt{(Wr\Delta R)^2 + (Wg\Delta G)^2 + (Wb\Delta B)^2}$$

with:

$\Delta R$=the distance between the red components of c1 and c2, $\Delta G$=the distance between the green components of c1 and c2, $\Delta B$=the distance between the blue components of c1 and c2, Wr=red weighting factor for human color perception of red, Wg=green weighting factor for human color perception of green, Wb=blue weighting factor for human color perception of blue;

assigning each of said n colors to one of said k colors to produce said compressed image; and storing a representation of said compressed image in a computer storage device.

2. The method of claim 1, wherein said distances are gamma corrected to match said display device.

3. The method of claim 2, wherein:

$\Delta R = r_{c1} - r_{c2}$, r is a gamma corrected red component, $\Delta G = g_{c1} - g_{c2}$, g is a gamma corrected green component, and $\Delta B = b_{c1} - b_{c2}$, b is gamma corrected blue component.

4. The method of claim 3, wherein said gamma corrected red, green and blue components are produced using the following equation:

$$\beta = kE^{1/\gamma}$$

Where:

$\beta$ is a gamma corrected brightness value, k is a maximum brightness value,

E is a desired linear brightness such that 0<E<1, and $\gamma$ is a gamma response of said display device.

5. The method of claim 1, wherein said weighting factors are NTSC weighting factors given by:

Wr=0.30,

Wg=0.59, and

Wb=0.11.

6. The method of claim 1, further comprising the step of generating a color look-up table for storing said k colors in a computer memory device.

7. The method of claim 1, wherein the step of storing a representation of said color-compresses image on a storage device includes storing said image on a computer disk.

8. The method of claim 1, further comprising the step of displaying said compressed image as an array of pixels represented by k pixel colors on said display device.

9. The method of claim 2, further comprising the step of displaying said compressed image as an array of pixels represented by k pixel colors on said display device.

10. The method of claim 1, wherein said computer storage device includes an optical disk.

11. The method of claim 1, wherein said computer storage device includes a magneto-optical disk.

12. The method of claim 1, wherein said computer storage device includes a magnetic disk.

13. A color-compression method for producing compressed images for display on a display device, comprising the steps of:

providing a first image having n colors;

defining a set of k presentation colors where k<n and each of said k presentation colors is at least a predetermined minimum distance $S_c$ from each of the other k−1 presentation colors;

selecting one of said k presentation colors to represent each of said n colors by determining which of said k presentation colors is perceptually closest to each of said n colors;

wherein perceptual closeness of two colors is defined by a distance metric incorporating a weighting factor for human visual sensitivity to a color component used in the distance metric; and storing said compressed image in a computer storage device.

14. The method of claim 13, further comprising the step of displaying said compresses image as an array of pixels represented by k pixel colors on said display device.

15. A color-compression method for compressing a digitized image having n colors into a presentation image having k presentation colors for display on a computer display, where k<n, comprising the steps of:

generating a histogram of said n colors to determine an order of frequency of occurrence of said n colors;

defining a color table comprising a plurality of J color layers with each said color layer having a plurality of colors by the steps of:

defining a first color distance criterion $S_c$ as a minimum spacing between colors within each said layer, defining a second color distance criterion $S_1$ as a minimum spacing between colors assigned to different layers, assigning k presentation colors to said layers one layer at a time in order of decreasing frequency of occurrence of said n colors as determined by said histogram until each layer is filled, each k presentation color being required to be at least $S_c$ from each other k presentation color within the same layer and with spacing between k presentation colors in any previously assigned layers being required to be at least $S_1$;

generating a presentation image by substituting said k colors for said n colors;

storing said presentation image in a computer storage device; and displaying said presentation image on said display device.

16. The color compression method of claim 15, further comprising the step of adjusting each of said k presentation colors to be the average of the colors assigned to each said k presentation color.

17. The color compression method of claim 15 wherein the number of colors per layer decreases from first layer to last layer.

18. The color compression method of claim 16 wherein the number of colors per layer decreases from first layer to last layer.

19. The color compression method of claim 15, further comprising the steps of determining which of said n colors have not been assigned to one of the k colors as a result of not meeting both said distance criteria; and assigning each said unassigned n color to one of said k presentation colors.

20. The color compression method of claim 19, wherein the step of assigning unassigned colors comprises assigning each of said unassigned colors to the color in said color table which is perceptually closest to said unassigned color.

21. The method of claim 15, wherein a distance d(c1,c2) between two colors c1 and c2 is calculated using the following equation:

$$d(c1,c2) = \sqrt{(Wr\Delta R)^2 + (Wg\Delta G)^2 + (Wb\Delta B)^2}$$

where:

$\Delta R = r_{c1} - r_{c2}$, r is a gamma corrected red component, $\Delta G = g_{c1} - g_{c2}$, g is a gamma corrected green component, and $\Delta B = b_{c1} - b_{c2}$, b is a gamma corrected blue component.

22. The method of claim 15, wherein a distance d(c1,c2) between two colors c1 and c2 is calculated using the following equation:

$$d(c1,c2) = (Wr\Delta R)^2 + (Wb\Delta B)^2$$

where:

$\Delta R = r_{c1} - r_{c2}$, r is a gamma corrected red component, $\Delta G = g_{c1} - g_{c2}$, g is a gamma corrected green component, and $\Delta B = b_{c1} - b_{c2}$, b is a gamma corrected blue component.

23. The method of claim 15, wherein a distance d(c1,c2) between two colors c1 and c2 is determined by use of a look-up table.

24. A compressed image device for producing a compressed image suitable for display on a computer display, comprising in combination:

storage media for storing computer files;

a color look-up table stored on said storage media, said color look-up table mapping a table index to a uniform color space accounting for human visual perception of colors for each of k presentation colors;

said presentation colors on said color look-up table comprising a plurality of layers of colors with each layer comprising a set of colors separated by no less than a first predetermined separation distance $S_c$, and each color is separated by no less than a second predetermined separation distance $S_1$ from all colors in any other said layer;

a presentation image file stored on said storage media, said presentation image file mapping pixels to said table index in said color look-up table.

25. A color-compression device for compressing a digitized image having n colors into a presentation image having k presentation colors in a manner suitable for display on a computer display device, comprising in combination:

a computer storage device for storing a histogram of said n colors to reveal an order of frequency of occurrence of said colors;

a color table comprising a plurality of J layers with each said layer having a plurality of colors with a minimum spacing $S_c$ between colors within the same layer, and a minimum spacing $S_1$ between colors assigned to different layers;

a programmed processor for assigning colors to said layers in order of said frequency of occurrence until each layer is filled, each color being required to be at least $S_c$ from each other color within the same layer and with spacing between colors in any previously assigned layers being required to be at least $S_1$; and means for storing said presentation image in said computer storage device.

26. The apparatus of claim 25, further comprising means for averaging a value of each color assigned to said layers and means for reassigning said average colors to said color table.

27. The apparatus of claim 25, further comprising a computer display for displaying said presentation image on said display device.

28. The apparatus of claim 25, wherein said computer storage device includes an optical disk.

29. The apparatus of claim 25, wherein said computer storage device includes a magneto-optical disk.

30. The method of claim 25, wherein said computer storage device includes a magnetic disk.

31. In a computer system which displays images as an array of pixels on a display device, a method of color-compression for reducing the number of pixel colors in a digitized image represented by n colors to produce a color compressed image represented by k pixel colors where k<n, comprising the steps of:

selecting a set of k pixel colors to represent said digitized image such that no two colors c1 and c2 of said k pixel colors are closer together than a predetermined distance d(c1,c2), where d(c1,c2) is defined by the euclidean distance between points c1 and c2, wherein said euclidean distance is modified by a weighting factor to correct said euclidean distance to account for human visual perception of color so that said corrected euclidean distance represents a distance in a uniform color space;

assigning each of said n colors to one of said k pixel colors to produce said compressed image; and storing a representation of said compressed image in a computer storage device.

32. The method of claim 31, further comprising a computer display for displaying said presentation image on said display device.

33. The method of claim 31, wherein said computer storage device includes an optical disk.

34. The method of claim 31, wherein said computer storage device includes a magneto-optical disk.

35. The method of claim 31, wherein said computer storage device includes a magnetic disk.

36. The method of claim 31, wherein said weighting factor includes an NTSC weighting factor.

37. The method of claim 31, wherein said step of selecting said set of k pixel colors is carried out by dividing said k pixel colors into clusters of pixel colors with no two pixel colors c1 and c2 within the same cluster being closer together than the predetermined distance d(c1,c2) and wherein no two pixel colors c1 and c3 in different clusters being closer together than a predetermined distance d(c1,c3) defined as the euclidean distance between points c1 and c3 in said approximately uniform color space.

38. In a computer system which displays images as an array of pixels on a display device, a method of color-compression for reducing the number of pixel colors in a digitized image represented by n colors to produce a color compressed image represented by k pixel colors where k<n, comprising the steps of:

selecting a set of k pixel colors to represent said digitized image such that no two colors c1 and c2 of said k pixel colors are closer together than a predetermined distance d(c1,c2), where d(c1,c2) is defined by:

$$d(c1,c2) = (Wr\Delta R)^2 + (Wg\Delta G)^2 + (Wb\Delta B)^2$$

with:

$\Delta R$=the distance between the red components of c1 and c2, $\Delta G$=the distance between the green components of c1 and c2, $\Delta B$=the distance between the blue components of c1 and c2, Wr=red weighting factor for human color perception of red, Wg=green weighting factor for human color perception of green, Wb=blue weighting factor for human color perception of blue;

assigning each of said n colors to one of said k pixel colors to produce said compressed image; and storing a representation of said compressed image in a computer storage device.

39. The method of claim 38, further comprising a computer display for displaying said presentation image on said display device.

40. The method of claim 38, wherein said computer storage device includes an optical disk.

41. The method of claim 38, wherein said computer storage device includes an magneto-optical disk.

42. The method of claim 38, wherein said computer storage device includes an magnetic disk.

43. The method of claim 38, wherein said red, green and blue weighting factors include NTSC weighting factors.

44. In a computer system which displays images as an array of pixels on a display device, a method of color-compression for reducing the number of pixel colors in a digitized image represented by n colors to produce a color compressed image represented by k pixel colors where k<n, comprising the steps of:

selecting a set of k pixel colors to represent said digitized image such that no two colors c1 and c2 of said k pixel colors are closer together than a predetermined distance d(c1,c2), where d(c1,c2) is defined by:

$$d(c1,c2) = \sqrt{(Wr\Delta R)^2 + (Wg\Delta G)^2 + (Wb\Delta B)^2}$$

with:

$\Delta R$=the gamma corrected distance between the red components of c1 and c2, $\Delta G$=the gamma corrected distance between the green components of c1 and c2, $\Delta B$=the gamma corrected distance between the blue components of c1 and c2, Wr=red weighting factor for human color perception of red, Wg=green weighting factor for human color perception of green, Wb=blue weighting factor for human color perception of blue;

storing said k pixel colors on a color look-up table;

assigning each of said n colors to one of said k pixel colors on said color look-up table to produce said compressed image; and storing a representation of said compressed image in a computer disk; and displaying said compressed image as an array of pixels having k pixel colors on a computer display for displaying said presentation image on said display device.

45. A color-compression device for compressing a digitized image having n colors into a presentation image having k presentation colors for display on a computer display device, comprising in combination:

a computer disk drive storage device for storing a histogram of said n colors to reveal an order of frequency of occurrence of said colors;

a color table comprising a plurality of J layers with each said layer having a plurality of colors with a minimum spacing $S_c$ between colors within the same layer, and a minimum spacing $S_1$ between colors assigned to different layers;

a programmed computer for assigning colors to said layers in order of said frequency of occurrence until each layer is filled, each color being required to be at least $S_c$ from each other color within the same layer and with spacing between colors in any previously assigned layers being required to be at least $S_1$;

a frame store for storing said presentation image as a frame of video;

a computer display, receiving said frame of video from said frame store and including a cathode ray tube, for visual display of said presentation image.

* * * * *